US012319550B2

(12) United States Patent
Dossous

(10) Patent No.: US 12,319,550 B2
(45) Date of Patent: Jun. 3, 2025

(54) PRY BAR HAVING A RETRACTABLE END GUARD

(71) Applicant: Consolidated Edison Company of New York, Inc., New York, NY (US)

(72) Inventor: Garry Dossous, Suffern, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 203 days.

(21) Appl. No.: 18/315,642

(22) Filed: May 11, 2023

(65) Prior Publication Data

US 2024/0375926 A1 Nov. 14, 2024

(51) Int. Cl.
*B66F 19/00* (2006.01)
*B66F 5/00* (2006.01)

(52) U.S. Cl.
CPC .............. *B66F 19/005* (2013.01); *B66F 5/00* (2013.01)

(58) Field of Classification Search
CPC ................................ B66F 15/00; B66F 19/005
See application file for complete search history.

(56) References Cited

U.S. PATENT DOCUMENTS

| | | | | | |
|---|---|---|---|---|---|
| 164,575 | A * | 6/1875 | McCall | B26B 5/001 | 30/162 |
| 2,053,707 | A * | 9/1936 | Farmer | E21B 12/04 | 206/349 |
| 3,633,640 | A * | 1/1972 | Moore | B25B 23/005 | 81/451 |
| 7,293,759 | B2 * | 11/2007 | Beach | B66F 19/005 | 254/131 |
| 11,457,777 | B1 * | 10/2022 | Lekic | A46B 5/00 | |
| 2015/0321331 | A1 * | 11/2015 | Carrera | B25G 1/12 | 81/490 |
| 2018/0117752 | A1 * | 5/2018 | Weber | B25G 3/20 | |
| 2022/0098018 | A1 * | 3/2022 | Hilderbrand | B66F 19/005 | |

* cited by examiner

*Primary Examiner* — Seahee Hong
(74) *Attorney, Agent, or Firm* — CANTOR COLBURN LLP

(57) ABSTRACT

A pry bar includes a member having a first end, a second end, and an intermediate portion, a prying member arranged at the second end; and a retractable end guard moveably mounted at the second end. The retractable end guard is selectively configurable between a first position in which the retractable end guard covers the prying member and a second position in which the prying member is exposed.

19 Claims, 10 Drawing Sheets

PRY BAR HAVING A RETRACTABLE END GUARD

BACKGROUND

The subject disclosure relates to the art of tools and, more particularly, to a pry bar having a retractable end guard.

Pry bars, particularly those sized to lift man-hole covers, forcibly open doors, and move other large objects typically include a tapered end. The tapered end is designed to be inserted between two adjacent surfaces. One of the two surfaces is desired to be moved with the other of the two surfaces may serves as a fulcrum for the pry bar. If the surface not suited to act as a fulcrum, another member may be used such as a rock, a brick, or the like. Often times, the pry bar is formed from a heavy, rigid material designed for harsh work environments. Further, the tapered end may have sharp edges that lend themselves for insertion between the two surfaces.

Generally, the pry bar is transported, uncovered, in a vehicle. During transport, the pry bar may shift around, bump into other objects, and the like. When contacting other objects, the tapered end may mar surface, create undesired dents, and the like. Accordingly, it would be desirable to provide a cover for the tapered end. Further, it would be desirable to form the cover in a manner that would facilitate it's use as a fulcrum when needed.

SUMMARY

A pry bar, in accordance with a non-limiting example, includes a member having a first end, a second end, and an intermediate portion, a prying member arranged at the second end; and a retractable end guard moveably mounted at the second end. The retractable end guard is selectively configurable between a first position in which the retractable end guard covers the prying member and a second position in which the prying member is exposed.

In addition to one or more of the features described herein, or as an alternative, further embodiments of the pry bar may include wherein the retractable end guard includes a first end portion coupled to the member and a second end portion, the first end portion having a first perimetrical dimension and the second end portion having a second perimetrical dimension that is larger than the first perimetrical dimension.

In addition to one or more of the features described herein, or as an alternative, further embodiments of the pry bar may include wherein the second end of the member includes a first diameter and the first perimetrical dimension defines a second diameter that is receptive of the first diameter.

In addition to one or more of the features described herein, or as an alternative, further embodiments of the pry bar may include a travel limiter arranged on the intermediate portion, wherein the member includes a shifting zone defined between the prying member and the travel limiter, the first end portion of the retractable end guard being movable along the shifting zone.

In addition to one or more of the features described herein, or as an alternative, further embodiments of the pry bar may include wherein the second end includes a plurality of external threads that extend along the shifting zone and the first end portion includes a plurality of internal threads that engage with the plurality of external threads.

In addition to one or more of the features described herein, or as an alternative, further embodiments of the pry bar may include a spring arranged on the member between the travel limiter and the first end portion of the retractable end guard.

In addition to one or more of the features described herein, or as an alternative, further embodiments of the pry bar may include wherein the travel limiter includes a flange that extend about and outwardly of the intermediate portion.

In addition to one or more of the features described herein, or as an alternative, further embodiments of the pry bar may include wherein the travel limiter is slidingly disposed on the intermediate portion.

In addition to one or more of the features described herein, or as an alternative, further embodiments of the pry bar may include wherein the travel limiter includes a locking mechanism configured to engage with the intermediate portion, the locking mechanism selectively fixing the travel limiter to the member.

In addition to one or more of the features described herein, or as an alternative, further embodiments of the pry bar may include wherein the second end portion of the retractable end guard includes a fulcrum surface.

In addition to one or more of the features described herein, or as an alternative, further embodiments of the pry bar may include wherein the retractable end guard includes an opening disposed between the first end and the fulcrum surface.

In addition to one or more of the features described herein, or as an alternative, further embodiments of the pry bar may include a shackle mounted to the intermediate portion, the shackle having an outwardly extending mounting ear.

In addition to one or more of the features described herein, or as an alternative, further embodiments of the pry bar may include a hook coupled to the outwardly extending mounting ear on the shackle.

In addition to one or more of the features described herein, or as an alternative, further embodiments of the system may include a magnetic device supported by the hook.

In addition to one or more of the features described herein, or as an alternative, further embodiments of the pry bar may include wherein the prying member includes a broadened profile.

In addition to one or more of the features described herein, or as an alternative, further embodiments of the pry bar may include wherein the broadened profile defines a curved blade.

In addition to one or more of the features described herein, or as an alternative, further embodiments of the pry bar may include wherein the broadened profile defines a chisel.

In addition to one or more of the features described herein, or as an alternative, further embodiments of the pry bar may include wherein the prying member includes a hook.

In addition to one or more of the features described herein, or as an alternative, further embodiments of the pry bar may include wherein the retractable end guard includes a locking mechanism arranged at the first end, the locking mechanism being configured to engage with the intermediate portion to selectively fixing the retractable end guard to the member.

In addition to one or more of the features described herein, or as an alternative, further embodiments of the pry bar may include wherein the retractable end guard includes an opening through which passes the prying member and a slidable panel that selectively covers the opening.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present disclosure provide for a system and method of isolating a busbar, such as in a busbar vault, to electrically isolate service or maintenance personnel from live conductors.

Figure 1:
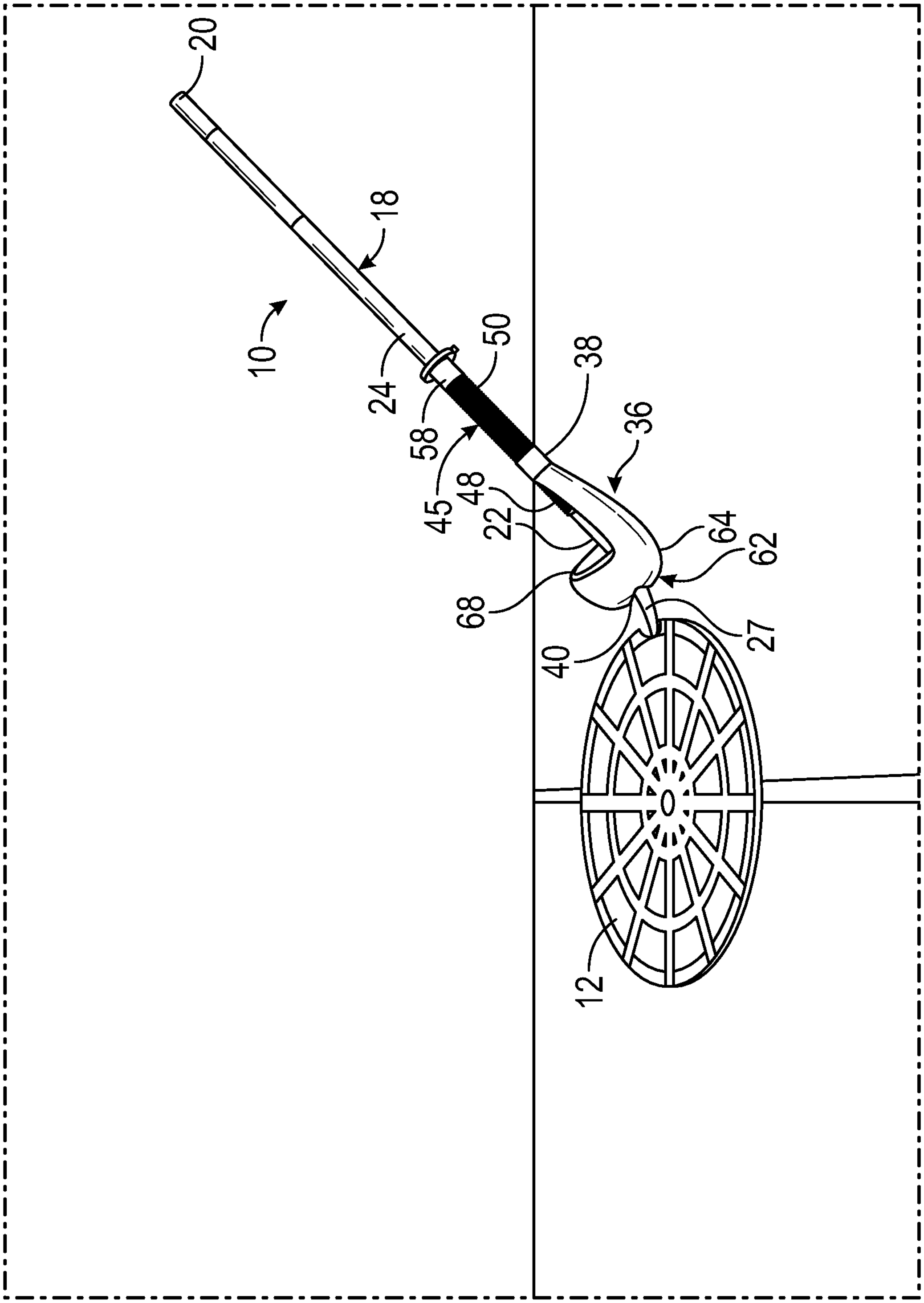
FIG. 1 depicts a pry bar having a retractable end guard preparing to raise a man hole cover, in accordance with a non-limiting example.
Figure 2:
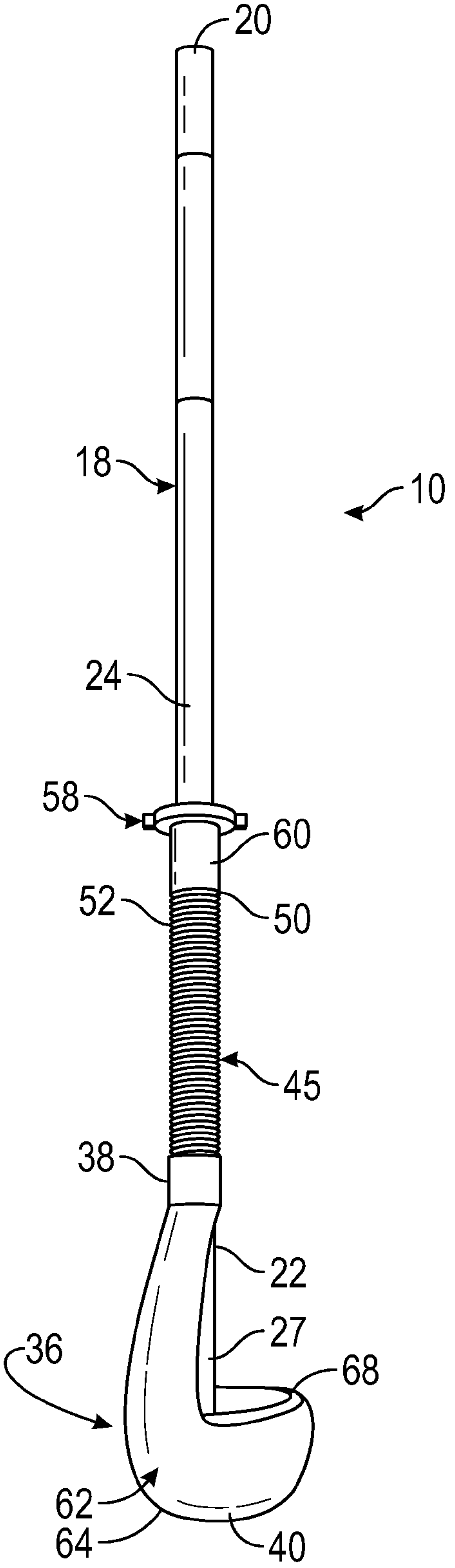
FIG. 2 is a plan view of the pry bar of FIG. 1 showing the retractable end guard covering a prying member, in accordance with a non-limiting example.

A pry bar, in accordance with a non-limiting example, is indicated generally at 10 in FIGS. 1 and 2. Pry bar 10 is shown raising a manhole cover 12. Pry bar 10 includes a member 18 having a first end 20, a second end 22, and an intermediate portion 24 that extends between first end 20 and second end 22. Second end 22 supports a prying member 27 having a broadened profile. In a non-limiting example, member 18 and prying member 27 may be fixedly connected such as by welding, integrally formed such as by forging, casting, drawing, or though material layups formed from one or more plies. Second end 22 includes a first diameter.

Figure 3:
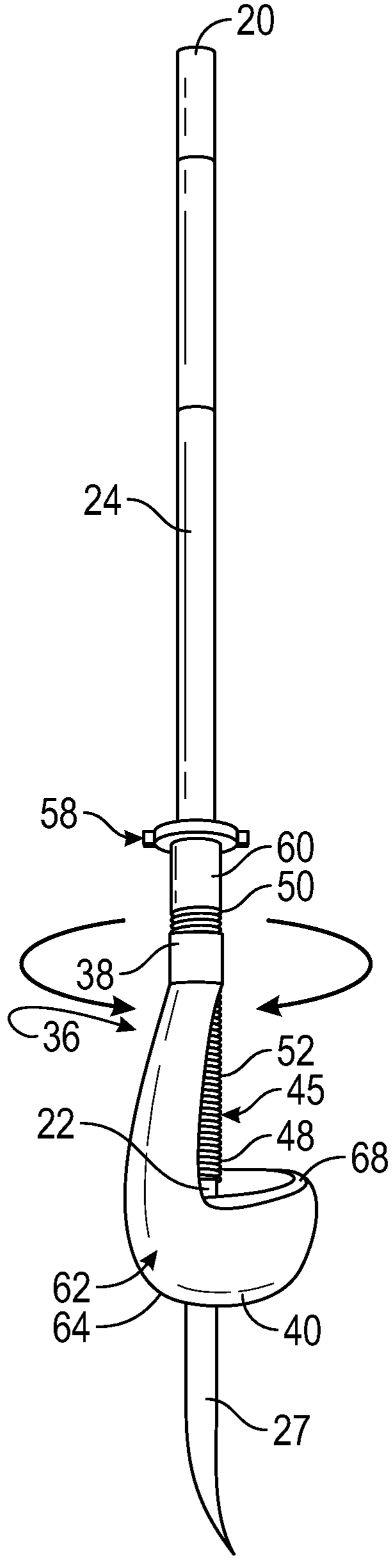
FIG. 3 is a plan view of the pry bar of FIG. 2 showing the retractable end guard shifted so as to expose the prying member, in accordance with a non-limiting example.
Figure 4:
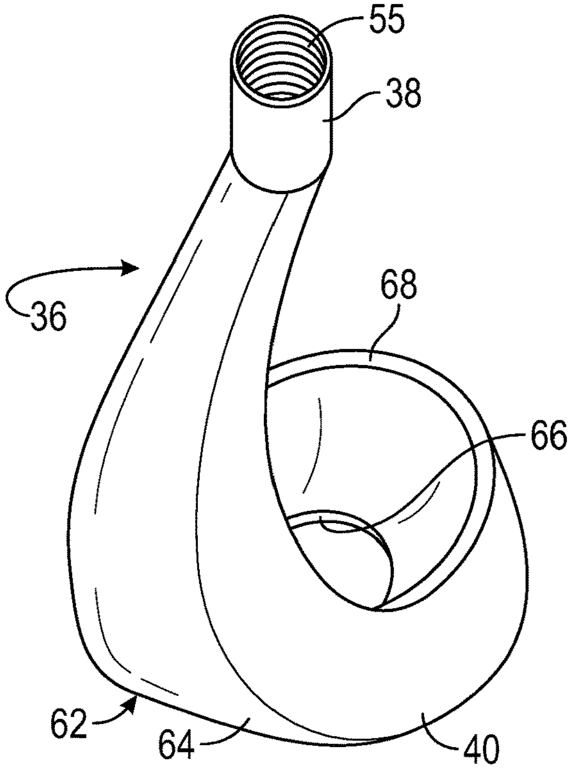
FIG. 4 is a perspective top view of the retractable end guard, in accordance with a non-limiting example.
Figure 5:
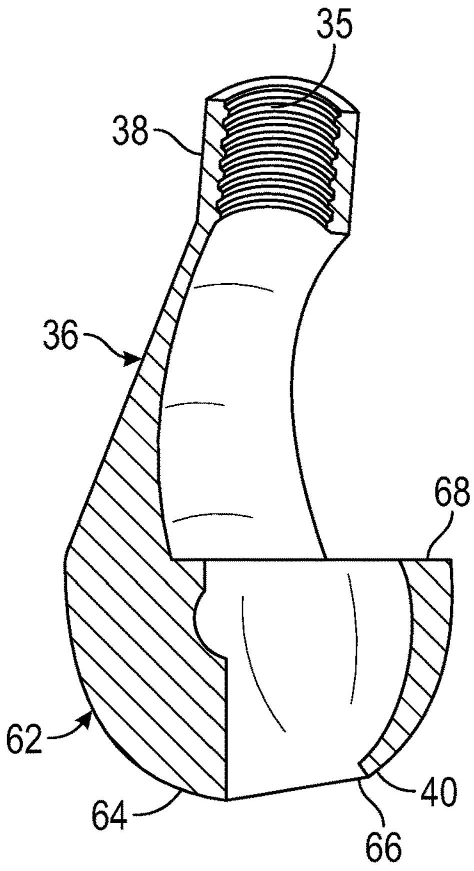
FIG. 5 is a cross-sectional side view of the retractable end guard of FIG. 4, in accordance with a non-limiting example.
Figure 6:
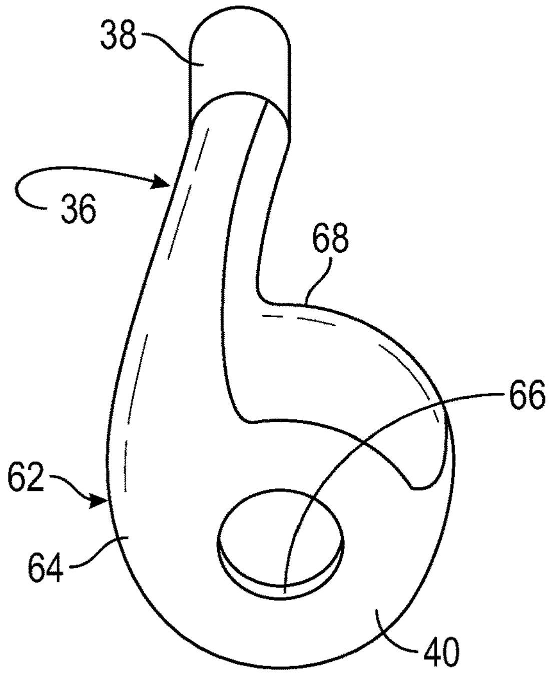
FIG. 6 is a perspective bottom view of the retractable end guard, in accordance with a non-limiting example.

In a non-limiting example, a retractable end guard 36 is connected to member 18 at second end 22. As will be detailed herein, retractable end guard 36 selectively covers and uncovers prying member 27. When not in use, such as shown in FIG. 2, retractable end guard 36 provides a protective cover. When in needed, retractable end guard 36 may be moved along intermediate portion 24 to expose prying member 27 as shown in FIG. 3.

As shown in FIGS. 2, 3, 4, 5 and 6, retractable end guard 36 includes a first end portion 38 that connects with member 18 and a second end portion 40. First end portion 38 includes a first perimetrical dimension defined by a second diameter and second end portion 40 includes a second perimetrical dimension defined by a third diameter. While shown as being round, first end portion 38 and/or second end portion 40 may take on various shapes.

In a non-limiting example, member 18 includes a shifting zone 45. Shifting zone 45 defines a portion of intermediate portion 24 across which retractable end guard 36 may move in order to expose and/or cover prying member 27. Shifting zone 45 includes a first end section 48, FIG. 3 that is positioned adjacent to prying member 27 at second end 22 and a second end section 50 spaced from second end 22 along intermediate portion 24. In a non-limiting example, shifting zone 45 includes a plurality of external threads 52 that extend between first end section 48 and second end section 50.

First end portion 38 of retractable end guard 36 includes a plurality of internal threads 55 (FIGS. 4 and 5) that are engaged with the plurality of external threads 52. In this manner, when retractable end guard 36 is rotated, second end portion 40 translates between first end section 48 and second end section 50 to selectively cover and/or uncover prying member 27. A travel limiter 58 may be arranged at second end section 50 to limit translation of second end portion 40 along intermediate portion 24. Travel limiter 58 may take the form of a bushing 60 arranged on intermediate portion 24 at second end section 50. Bushing 60 may be threadably engaged with external threads 52.

In a non-limiting example, retractable end guard 36 includes a fulcrum surface 62 arranged at second end portion 40. Fulcrum surface 62 is defined by a rounded portion 64 of second end portion 40. Fulcrum surface 62 provides users with a built in mechanical advantage when using pry bar 10. That is, when a portion of prying member 27 is exposed, fulcrum surface 62 may be forced against a surface allowing member 18 to form a lever. In this manner, pry bar 10 reduced the amount of energy needed to lift a heavy or stuck object. Also, it eliminates the need for the user to locate and employ a separate fulcrum when lifting heavy or stuck objects.

In addition to fulcrum surface 62, retractable end guard 36 includes a first opening 66 at second end portion 40 that provides a passage for prying member 27 and a second opening 68 that is provided between first end portion 38 and second end portion 40. Second opening 68 may be used to inspect and/or clean prying member 27 or simply to reduce an overall weight of retractable end guard 36.

Figure 7:
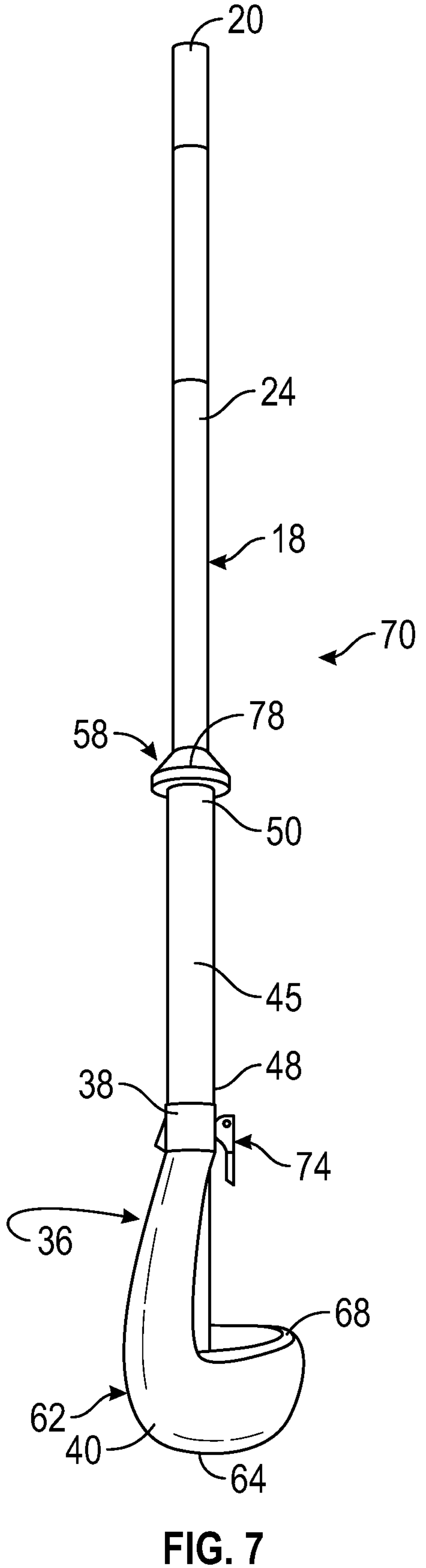
FIG. 7 is a plan view of the pry bar, in accordance with another non-limiting example.

Reference will now follow to FIG. 7, wherein like reference numbers represent corresponding parts in the separate views in describing a pry bar 70 in accordance with another non-limiting example. In the non-limiting example shown, shifting zone 45 includes a smooth surface allowing retractable end guard 36 to transition between first end section 48 and second end section 50 without the need for rotation. A locking mechanism 74 is provided on second end portion 40 or retractable end guard 36. Locking mechanism 74 selectively engages shifting zone 45 to retain a selected position for retractable end guard 36. Further, in the non-limiting example shown, travel limiter 58 is shown in the form of a flange 78 that extends about and outwardly of intermediate portion 24.

Figure 8:
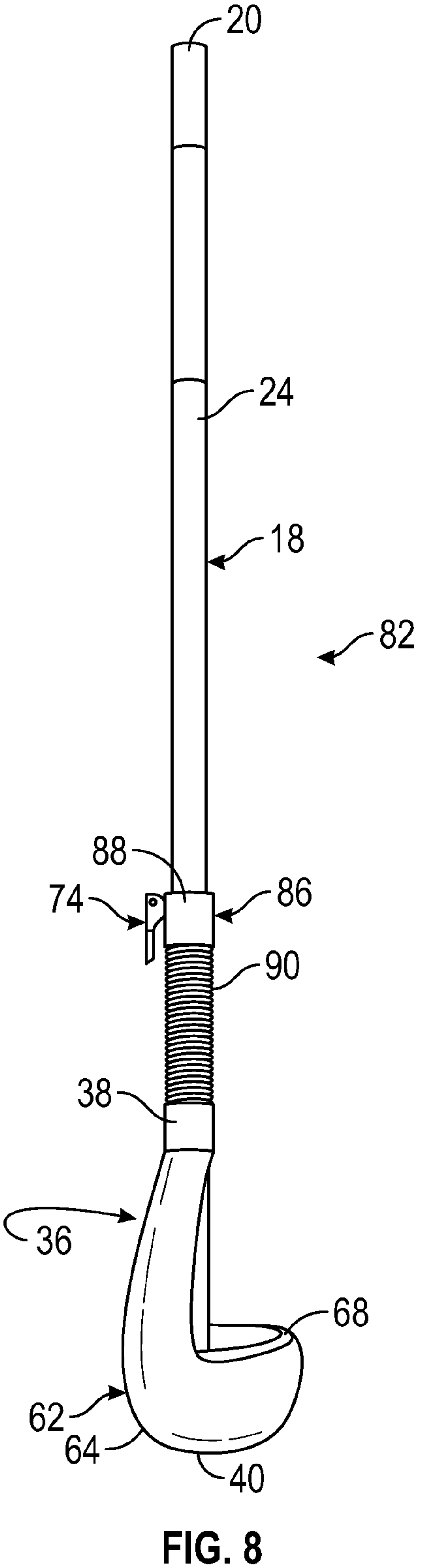
FIG. 8 is a plan view of the pry bar, in accordance with yet another non-limiting example.

Reference will now follow to FIG. 8, wherein like reference numbers represent corresponding parts in the separate views in describing a pry bar 98 in accordance with another non-limiting example. Pry bar 82 includes a travel limiter 86 including a locking mechanism 88. Locking mechanism 88 selectively engages shifting zone 45 to retain a selected position for retractable end guard 36. In a nonlimiting example, travel limiter 86 may be connected to retractable end guard 36 through a spring 90. Spring 90 biases retractable end guard 36 axially outwardly so as to cover prying member 27. When needed, a user simply urges member 18 into retractable end guard 36 to expose and utilize prying member 27.

Figure 9:
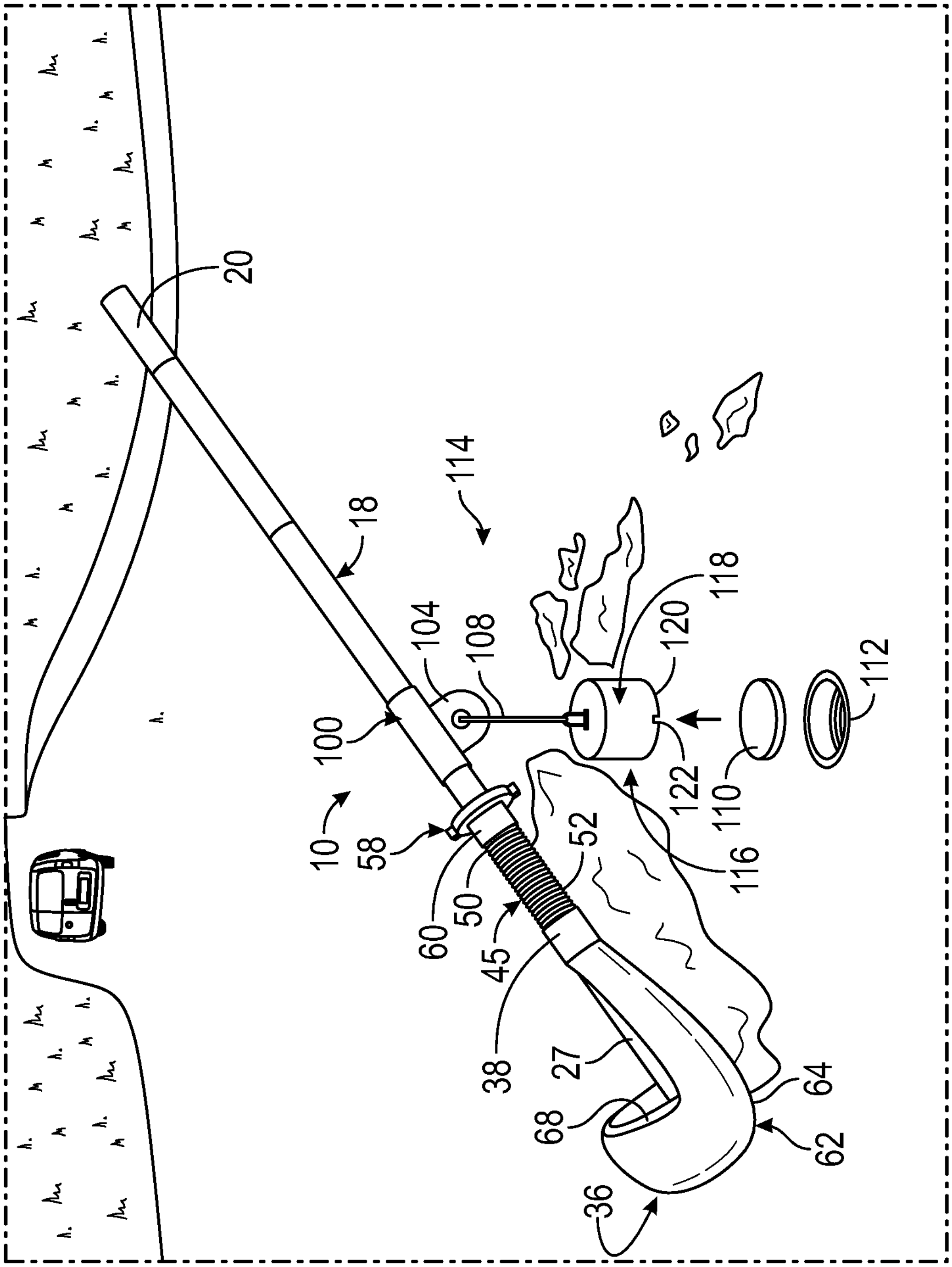
FIG. 9 is a plan view of the pry bar including a magnetic device used to lift a gas valve lid from a valve box, in accordance with still yet another non-limiting example.

Reference will now follow to FIG. 9, wherein like reference numbers represent corresponding parts in the separate views in describing a shackle 100 positioned on intermediate portion 24 of member 18. Shackle 100 includes an outwardly projecting mounting ear 104 that supports a hook 108. In this configuration, pry bar 10 may be used to remove a gas valve lid 110 that sits in a valve box ring 112 installed in a road surface 114. A magnetic device 116 is connected to hook 108.

Figure 10:
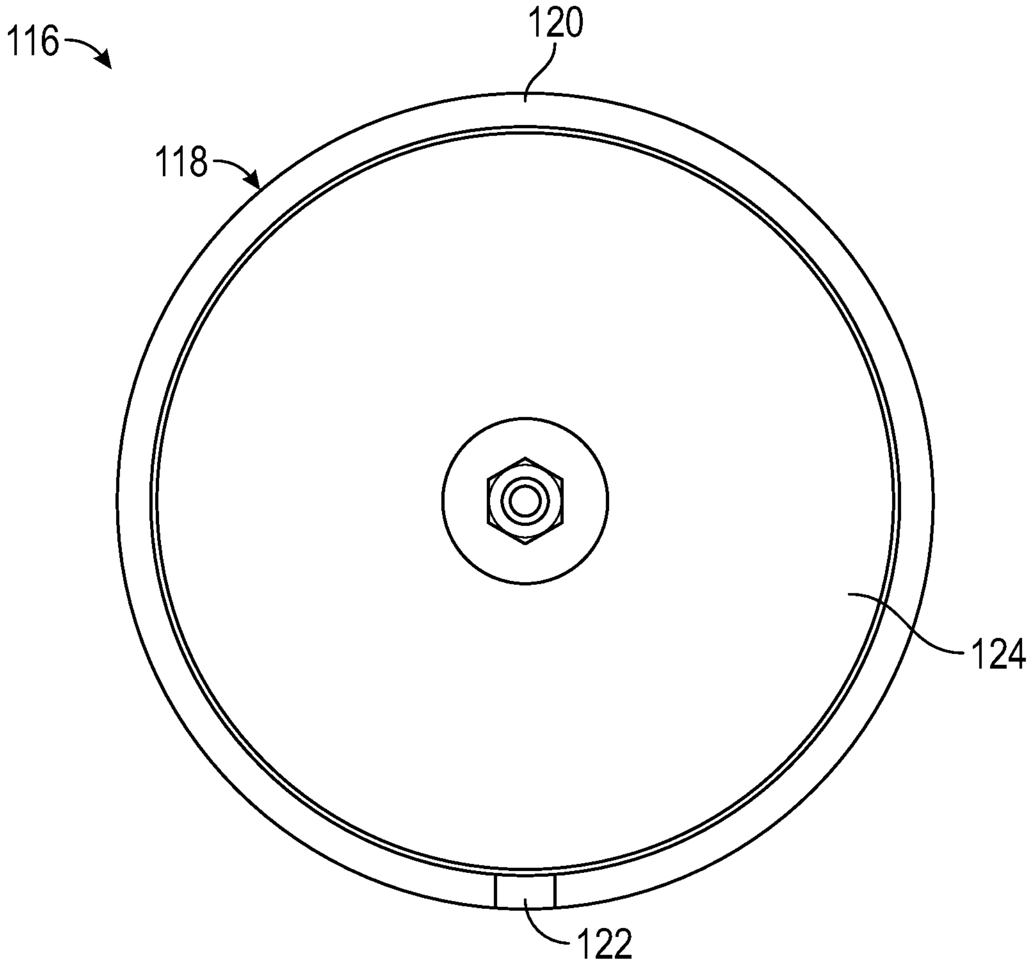
FIG. 10 is a lower plan view of the magnetic device of FIG. 9.

As shown in FIG. 10, magnetic device 116 includes a housing 118 having a lower circumferential edge 120. Lower circumferential edge 120 may include a notch 122. A magnet 124 is arranged in housing 118. In a non-limiting example, magnetic device 116 is lowered onto and connected with gas valve lid 110. At this point, first end 20 is lifted with fulcrum surface 62 providing a mechanical advantage that reduces an amount of effort needed to remove gas valve lid 110 from valve box ring 112. Shackle 100 may be selectively repositioned along member 18 depending upon an amount of force needed to remove, for example, gas valve lid 110 or similar, magnetic objects.

Figure 11:
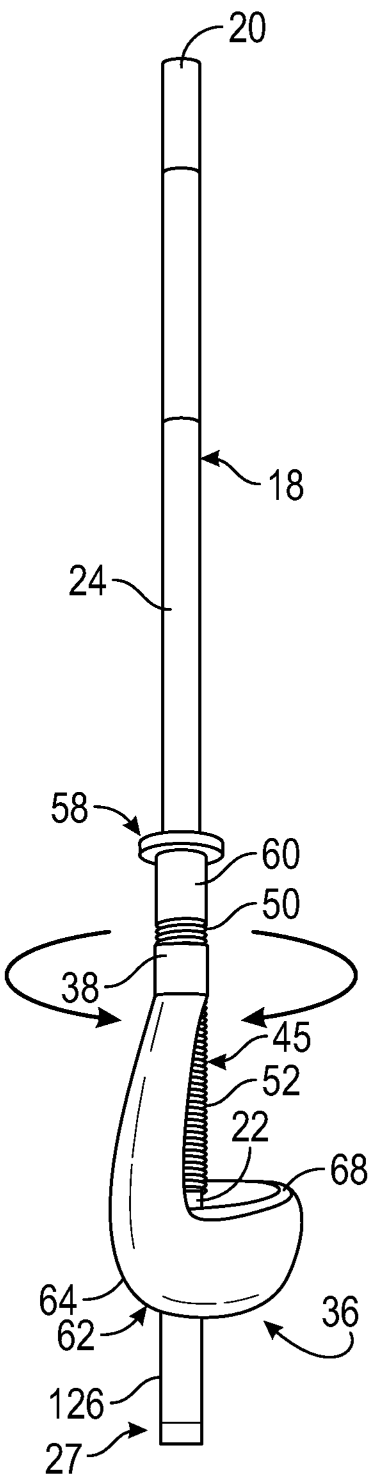
FIG. 11 is a perspective view of a prying member, in accordance with a non-limiting example.
Figure 12:
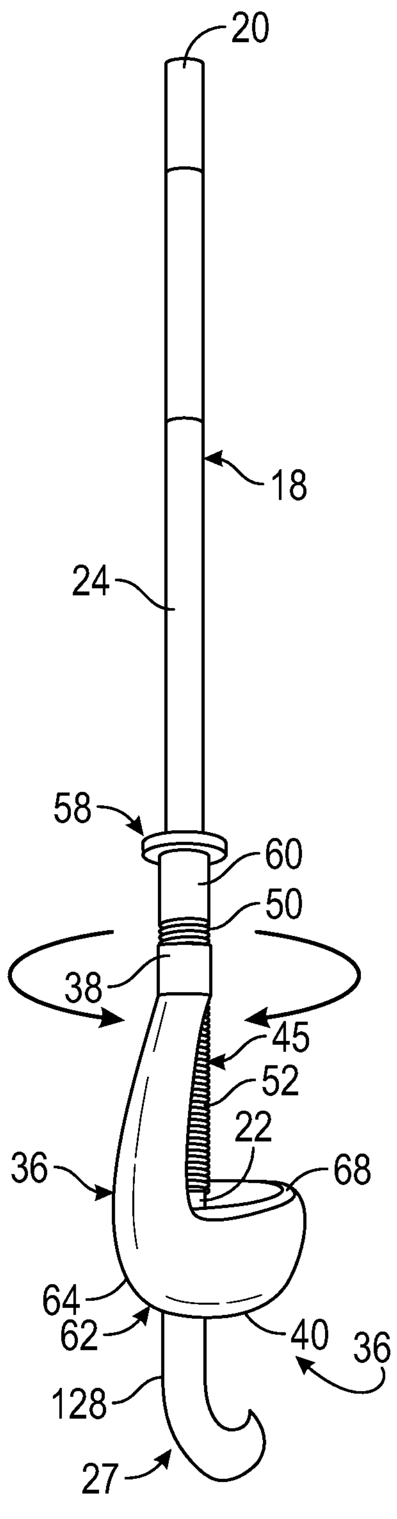
FIG. 12 is a perspective view of a prying member, in accordance with another non-limiting example.
Figure 13:
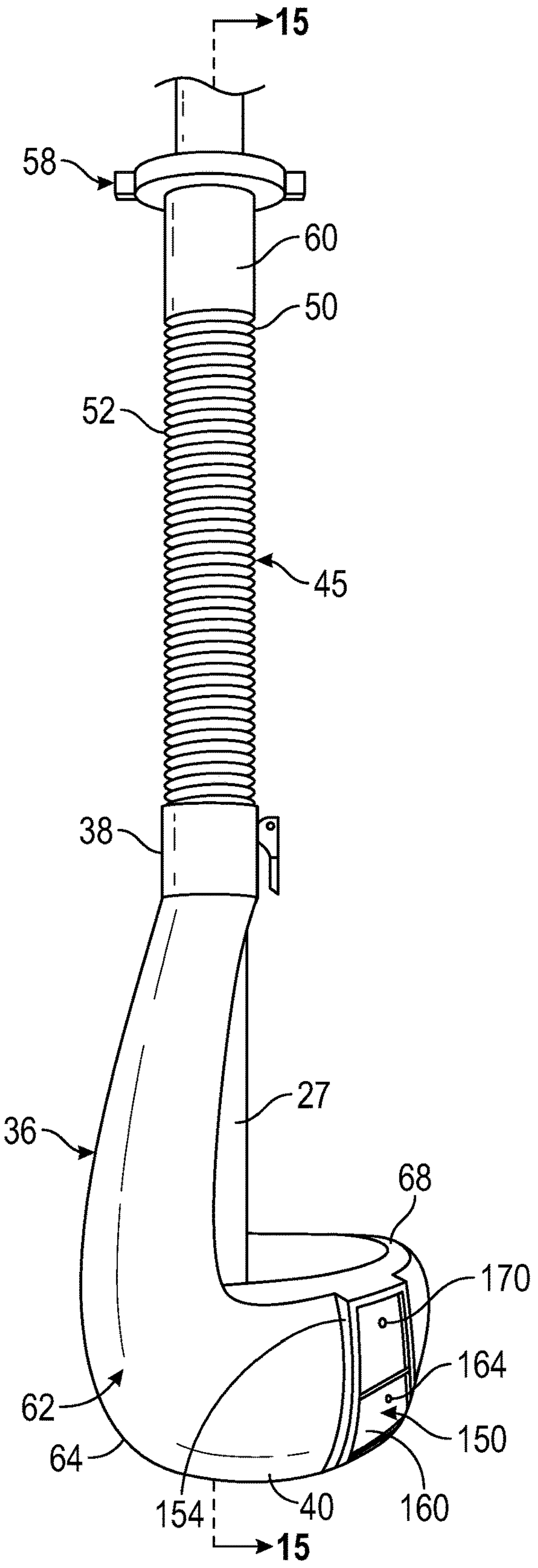
FIG. 13 is a front plan view of the retractable end guard including a slidable panel, in accordance with a non-limiting example.
Figure 14:
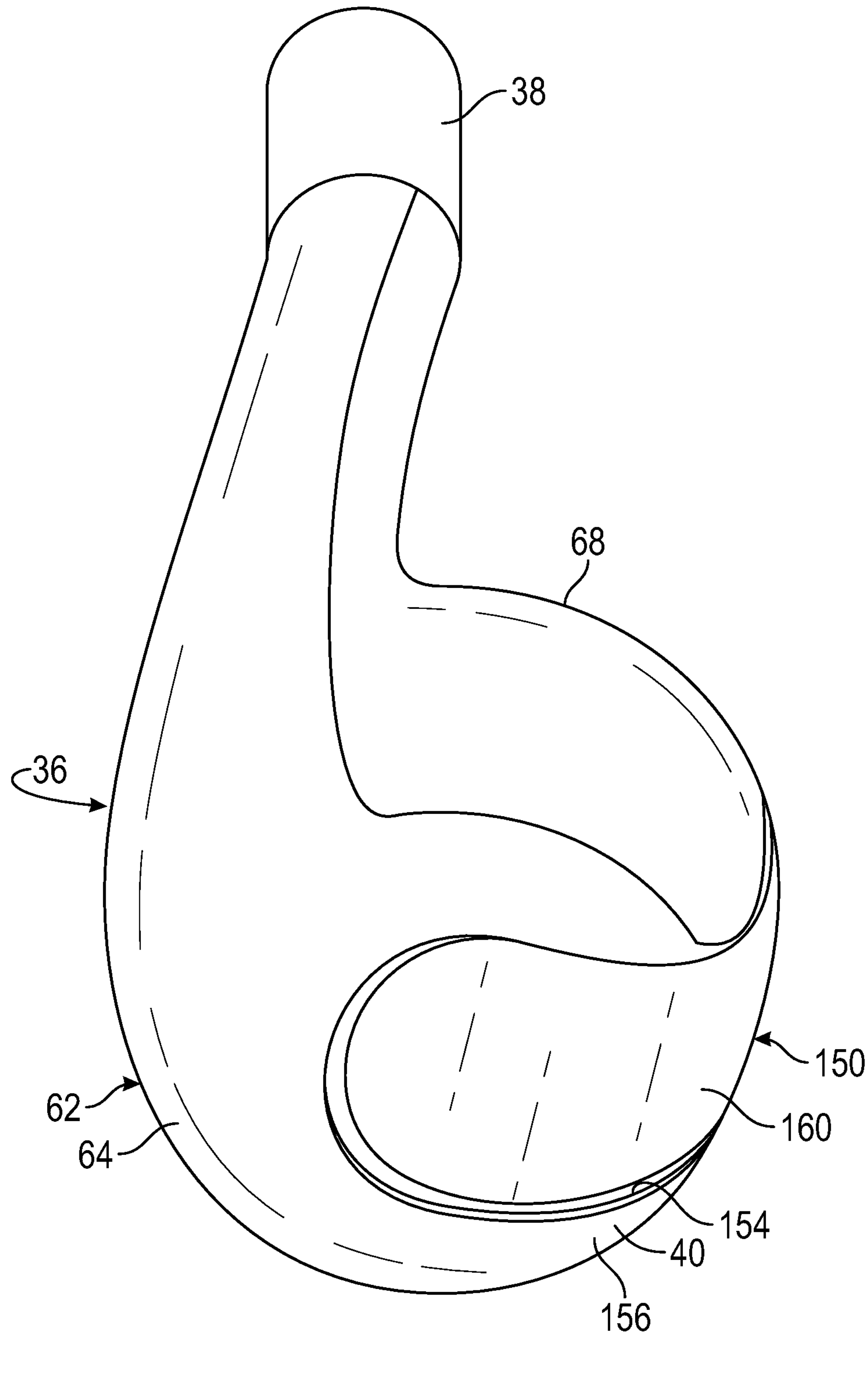
FIG. 14, is a lower perspective view of the retractable end guard of FIG. 13, in accordance with a non-limiting example.

At this point, it should be understood Further, the particular geometry of the prying member may vary. In addition to the curved blade shown in FIG. 3, the prying member may take the form of a chisel 126, as shown in FIG. 11, or a hook 128, as shown in FIG. 12. Further, in accordance with another non-limiting example shown in FIGS. 13 and 14, retractable end guard 36 may include a retractable cover 150 that may selectively cover first opening 66 when pry bar 10 is not in use.

Figure 15:
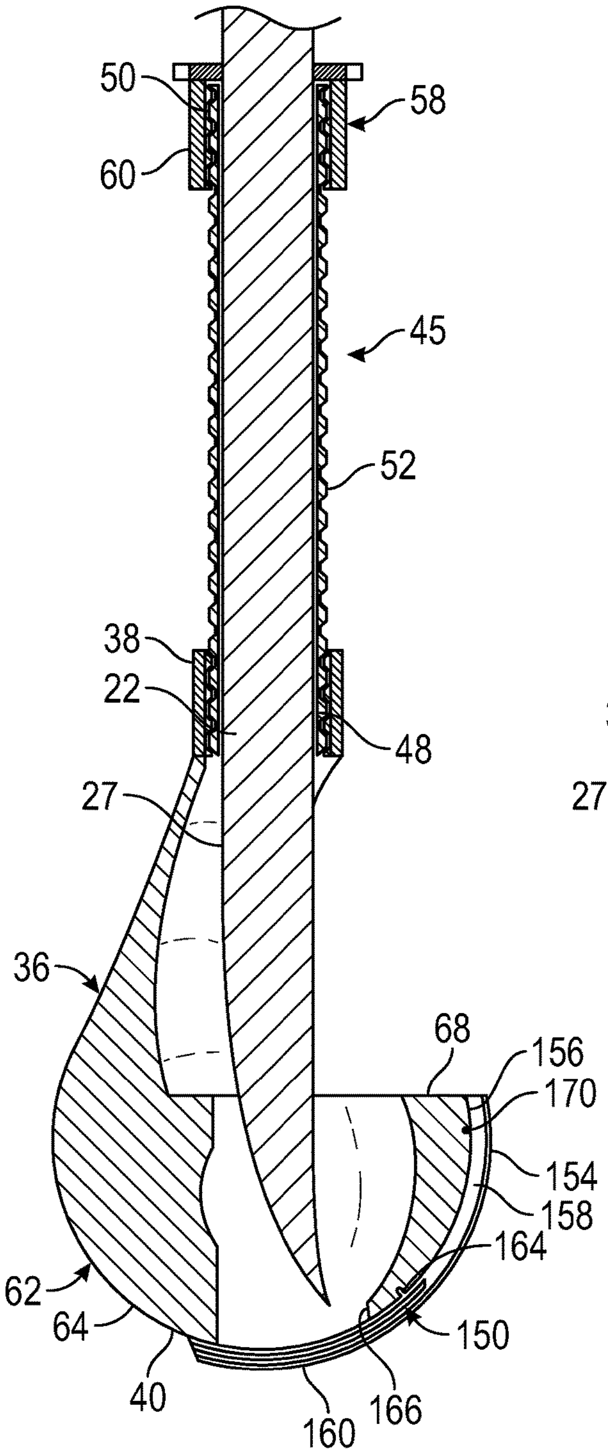
FIG. 15 is a cross-sectional view of the retractable end guard taken through the line 15-15 in FIG. 13 showing the slidable panel in a closed position, in accordance with a non-limiting example.
Figure 16:
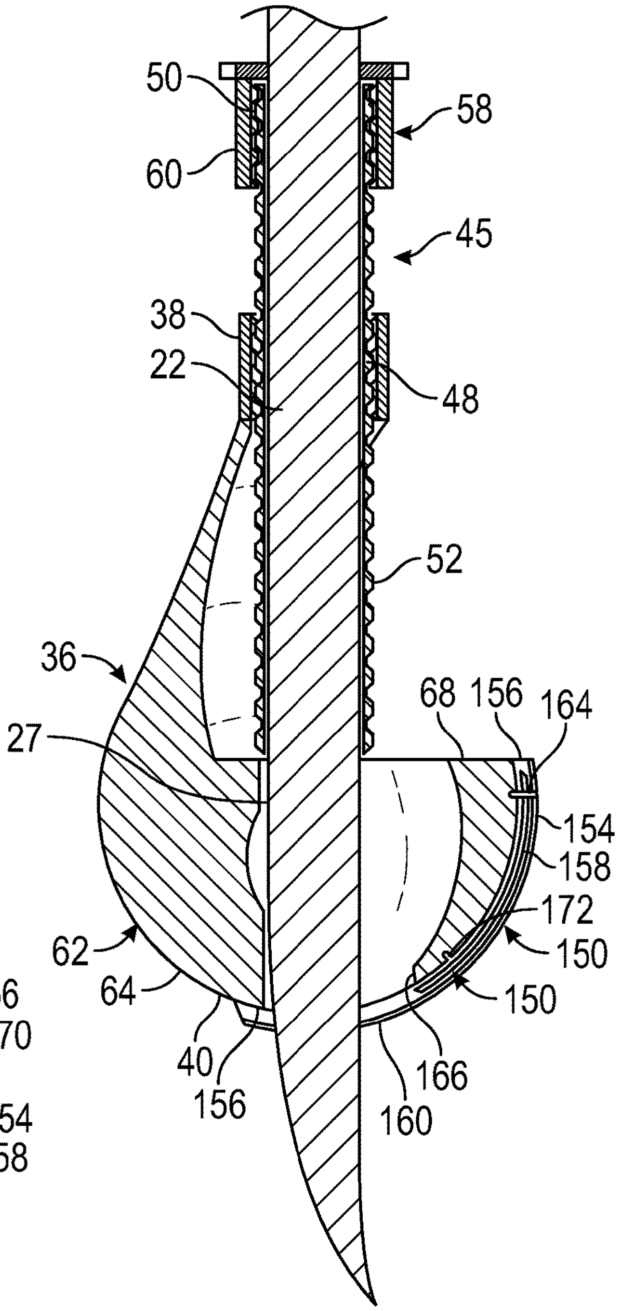
FIG. 16 is a cross-sectional view of the retractable end guard of FIG. 15 showing the slidable panel in an open position, in accordance with a non-limiting example.

In accordance with a non-limiting example, retractable cover 150 includes a cover guide 154 that is spaced from an outer surface 156 of retractable end guard 36. Cover guide 154 defines a channel 158 that is receptive of a slidable panel 160. Slidable panel 160 may transition between a first position, FIG. 15, covering first opening 66 and a second position, FIG. 16, in which first opening 66 is exposed. Slidable panel 160 may support a retractable pin 164 that is spring biased. In the first position, retractable pin 164 is received by a first notch 170 and in the second position, retractable pin 164 is received by a second notch 172. In this manner, slidable panel 160 may b selectively secured in either the first position or the second position.

The terms “a” and “an” do not denote a limitation of quantity, but rather denote the presence of at least one of the referenced item. The term “or” means “and/or” unless clearly indicated otherwise by context. Reference throughout the specification to “an aspect”, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

The terms “about” and “substantially” are intended to include the degree of error associated with measurement of the particular quantity based upon the equipment available at the time of filing the application. For example, “about” and/or “substantially” can include a range of ±8% or 5%, or 2% of a given value.

When an element such as a layer, film, region, or substrate is referred to as being “on” another element, it can be directly on the other element or intervening elements may also be present. In contrast, when an element is referred to as being “directly on” another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A pry bar comprising:

an elongated member having a first end, a second end, and an intermediate portion;

a prying member arranged at the second end; and a retractable end guard moveably mounted at the second end, the retractable end guard being selectively configurable between a first position in which the retractable end guard covers the prying member and a second position in which the prying member is exposed, wherein the retractable end guard includes an opening through which passes the prying member and a slidable panel that selectively covers the opening.

2. The pry bar according to claim 1, wherein the retractable end guard includes a first end portion coupled to the elongated member and a second end portion, the first end portion having a first perimetrical dimension and the second end portion having a second perimetrical dimension that is larger than the first perimetrical dimension.

3. The pry bar according to claim 2, wherein the second end of the elongated member includes a first diameter and the first perimetrical dimension defines a second diameter that is receptive of the first diameter.

4. The pry bar according to claim 3, further comprising a travel limiter arranged on the intermediate portion, wherein the elongated member includes a shifting zone defined between the prying member and the travel limiter, the first end portion of the retractable end guard being movable along the shifting zone.

5. The pry bar according to claim 4, further comprising a spring arranged on the elongated member between the travel limiter and the first end portion of the retractable end guard.

6. The pry bar according to claim 4, wherein the travel limiter includes a flange that extend about and outwardly of the intermediate portion.

7. The pry bar according to claim 4, wherein the travel limiter is slidingly disposed on the intermediate portion.

8. The pry bar according to claim 7, wherein the travel limiter includes a locking mechanism configured to engage with the intermediate portion, the locking mechanism selectively fixing the travel limiter to the elongated member.

9. The pry bar according to claim 1, further comprising a shackle mounted to the intermediate portion, the shackle having an outwardly extending mounting ear.

10. The pry bar according to claim 9, further comprising a hook coupled to the outwardly extending mounting ear on the shackle.

11. The pry bar according to claim 10, further comprising: a magnetic device supported by the hook.

12. The pry bar according to claim 1, wherein the prying member includes a broadened profile.

13. The pry bar according to claim 12, wherein the broadened profile defines a curved blade.

14. The pry bar according to claim 12, wherein the broadened profile defines a chisel.

15. The pry bar according to claim 1, wherein the prying member includes a hook.

16. The pry bar according to claim 2, wherein the retractable end guard includes a locking mechanism arranged at the first end, the locking mechanism being configured to engage with the intermediate portion to selectively fixing the retractable end guard to the elongated member.

17. A pry bar comprising:

an elongated member having a first end, a second end, and an intermediate portion, wherein the second end of the elongated member includes a first diameter and the first perimetrical dimension defines a second diameter that is receptive of the first diameter;

a prying member arranged the second end, a retractable end guard moveably mounted at the second end, the retractable end guard being selectively configurable between a first position in which the retractable end guard covers the prying member and a second position in which the prying member is exposed, wherein the retractable end guard includes a first end portion coupled to the elongated member and a second end portion, the first end portion having a first perimetrical dimension and the second end portion having a second perimetrical dimension that is larger than the first perimetrical dimension; and a travel limiter arranged on the intermediate portion, wherein the elongated member includes a shifting zone defined between the prying member and the travel limiter, the first end portion of the retractable end guard being moveable along the shifting zone, and wherein the second end includes a plurality of external threads that extend along the shifting zone and the first end portion includes a plurality of internal threads that engage with the plurality of external threads.

18. A pry bar comprising:

an elongated member having a first end, a second end, and an intermediate portion;

a prying member arranged at the second end; and a retractable end guard moveably mounted at the second end, the retractable end guard being selectively configurable between a first position in which the retractable end guard covers the prying member and a second position in which the prying member is exposed, wherein the retractable end guard includes a first end portion coupled to the elongated member and a second end portion, the first end portion having a first perimetrical dimension and the second end portion having a second perimetrical dimension that is larger than the first perimetrical dimension, wherein the second end portion of the retractable end guard includes a fulcrum surface.

19. The pry bar according to claim 18, wherein the retractable end guard includes an opening disposed between the first end and the fulcrum surface.

* * * * *